United States Patent
Wilson et al.

(10) Patent No.: US 7,313,164 B1
(45) Date of Patent: Dec. 25, 2007

(54) METHOD AND SYSTEM FOR SWITCHING AND DETECTING PN CODES FOR FAST ACQUISITION OF BURST SIGNAL

(76) Inventors: Michael L. Wilson, 4635 S. 2930 W. #138, West Valley City, UT (US) 84119; Randal R. Sylvester, 3948 S. Contadora Cir., West Valley City, UT (US) 84128; Patricia F. Batzer, 691 Raygene Way, North Salt Lake City, UT (US) 84054

( * ) Notice: Subject to any disclaimer, the term of this patent is extended or adjusted under 35 U.S.C. 154(b) by 717 days.

(21) Appl. No.: 10/675,184

(22) Filed: Sep. 30, 2003

(51) Int. Cl.
*H04B 1/69* (2006.01)
(52) U.S. Cl. .................................................. 375/141
(58) Field of Classification Search ................ 375/141, 375/130, 140, 146, 295; 455/11.1, 450, 561, 455/426
See application file for complete search history.

(56) References Cited

U.S. PATENT DOCUMENTS

| | | | |
|---|---|---|---|
| 4,928,310 A | 5/1990 | Goutzoulis et al. | |
| 5,303,258 A | * 4/1994 | Nakamura | ................... 375/142 |
| 5,519,736 A | 5/1996 | Ishida | |
| 5,805,635 A | 9/1998 | Andrews, Jr. et al. | |
| 5,960,029 A | 9/1999 | Kim et al. | |
| 6,005,889 A | 12/1999 | Chung et al. | |
| 6,132,306 A | * 10/2000 | Trompower | ................ 455/11.1 |

* cited by examiner

*Primary Examiner*—Khai Tran (57) ABSTRACT

A method and system is disclosed for generating and detecting variable sequence PN codes. PN-Code sequence changes based on varying interceptor threat levels are generated at a rate fast enough to avoid exploitation while maintaining a reasonable correlation search window. The PN code sequence is phase shifted by N-chips based on the severity of the threat environment. A synchronized receiver demodulates the PN encoded signal by correlating over every possible phase of the PN code sequence. The receiver includes first and second correlators and threshold detectors adapted to detect PN signals with varying PN code sequence changes.

16 Claims, 5 Drawing Sheets

METHOD AND SYSTEM FOR SWITCHING AND DETECTING PN CODES FOR FAST ACQUISITION OF BURST SIGNAL

CROSS REFERENCE TO RELATED APPLICATIONS

U.S. patent application Ser. No. 10/352,295 filed Jan. 27, 2003, ENTITLED "METHOD AND SYSTEM FOR RAPID AUTOMATIC DATA RATE DISCOVERY FOR PN CODES". The disclosure of this Non-provisional patent application is incorporated by reference herein in its entirety to the extent it does not conflict with the teachings presented herein.

BACKGROUND OF THE INVENTION

1. Field of the Invention

The present invention relates to spread spectrum communication systems using PN coding techniques and, more particularly, to a method and system for generating and detecting variable sequence PN codes.

2. Description of Related Art

Spread spectrum (SS) systems, which may be CDMA systems, are well known in the art. SS systems can employ a transmission technique in which a pseudo-noise (PN) PN-code sequence is used as a modulating waveform to spread the signal energy over a bandwidth much greater than the signal information bandwidth. At the receiver, the signal is de-spread or acquired using a synchronized replica of the PN-code sequence.

In general, there are two basic types of SS systems: direct sequence spread spectrum systems (DSSS) and frequency hop spread spectrum systems (FHSS).

The DSSS systems spread the signal over a bandwidth $f_{RF \pm Rc}$, where $f_{RF}$ represents the carrier frequency and $R_c$ represents the PN-code chip rate, which in turn may be an integer multiple of the symbol rate $R_s$. Multiple access systems employ DSSS techniques when transmitting multiple channels over the same frequency bandwidth to multiple receivers, each receiver sharing a common PN code sequence or having its own designated PN-code. Although each receiver receives the entire frequency bandwidth, only the signal with the receiver's matching PN-code sequence will appear intelligible; the rest appears as noise that is easily filtered.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time, a PN generator feeds a frequency synthesizer a sequence of n chips that dictates one of 2n frequency positions. The receiver follows the same frequency hop pattern.

Most often the PN-code sequences are very long codes, which deny an intercepting receiver the ability to determine the sequence and exploit it.

Systems employing a hailing signal burst often call for a receiver to acquire and receive data within a short time frame, e.g., two milliseconds. To detect a preamble quickly upon arrival at a receiver, a large parallel correlator may be used to search for the full PN sequence. To satisfy low latency requirements on the hailing channel, using the same PN sequence at the beginning of each hail makes detection and acquisition of the hail easier, since the parallel correlator can always be searching for a fixed sequence. However, a short, repeated PN code is vulnerable to an intercept receiver.

Other options for PN-code sequences include free running PN codes in which the PN code continually runs (i.e., a long PN code) whether a burst hail is present or not. Searching for a free running PN-code is difficult because the range or uncertainty of communication range uncertainty increases the search window thus increasing the noise level in the detection receiver. Furthermore, free running codes require a prohibitive increase in hardware necessary for searching each possible phase of the preamble sequence.

It is therefore an object of the present invention to provide a method and system for generating PN-code sequence changes periodically at a rate fast enough to avoid exploitation by an interceptor of a burst hailing channel, while maintaining a suitable correlation search window.

It is a further object of the present invention to provide a method and system for generating PN-code sequence changes at a slower rate than the chipping rate.

It is still a further object of the present invention to provide a method and system that allows for fast acquisition time of a burst signal without a prohibitive growth in hardware.

SUMMARY OF THE INVENTION

The foregoing and other problems are overcome, and other advantages are realized, in accordance with the presently preferred embodiments of these teachings.

In accordance with one embodiment of the present invention a method is disclosed for generating PN-Code sequence changes based on varying interceptor threat levels. The method includes encoding a transmitter PN signal with a PN code sequence based on a given interceptor threat level. The PN code sequence is phase shifted by N-chips based on the severity of the threat environment. A synchronized receiver demodulates the PN encoded signal by correlating over every possible phase of the PN code sequence.

In accordance with another embodiment of the present invention a spread spectrum communications system is provided. The system includes a HUB with a transmitter for generating a spread spectrum waveform where the transmitter includes at least one PN-Code generator for generating PN-Code sequence and a modulator for encoding a transmitter PN signal with the PN code sequence. The system also includes at least one SPOKE with a receiver, wherein the at least one receiver includes a demodulator adapted to decode a transmitted PN signal. The receiver includes first and second correlators and threshold detectors adapted to detect PN signals with varying PN code sequence changes.

The invention is also directed towards a program storage device readable by a machine, tangibly embodying a program of instructions executable by the machine to perform a method of generating PN-Code sequence changes based on varying interceptor threat levels. The method includes encoding a transmitter PN signal with a PN code sequence based on a given interceptor threat level. The PN code sequence is phase shifted by N-chips based on the severity of the threat environment. A synchronized receiver demodulates the PN encoded signal by correlating over every possible phase of the PN code sequence.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
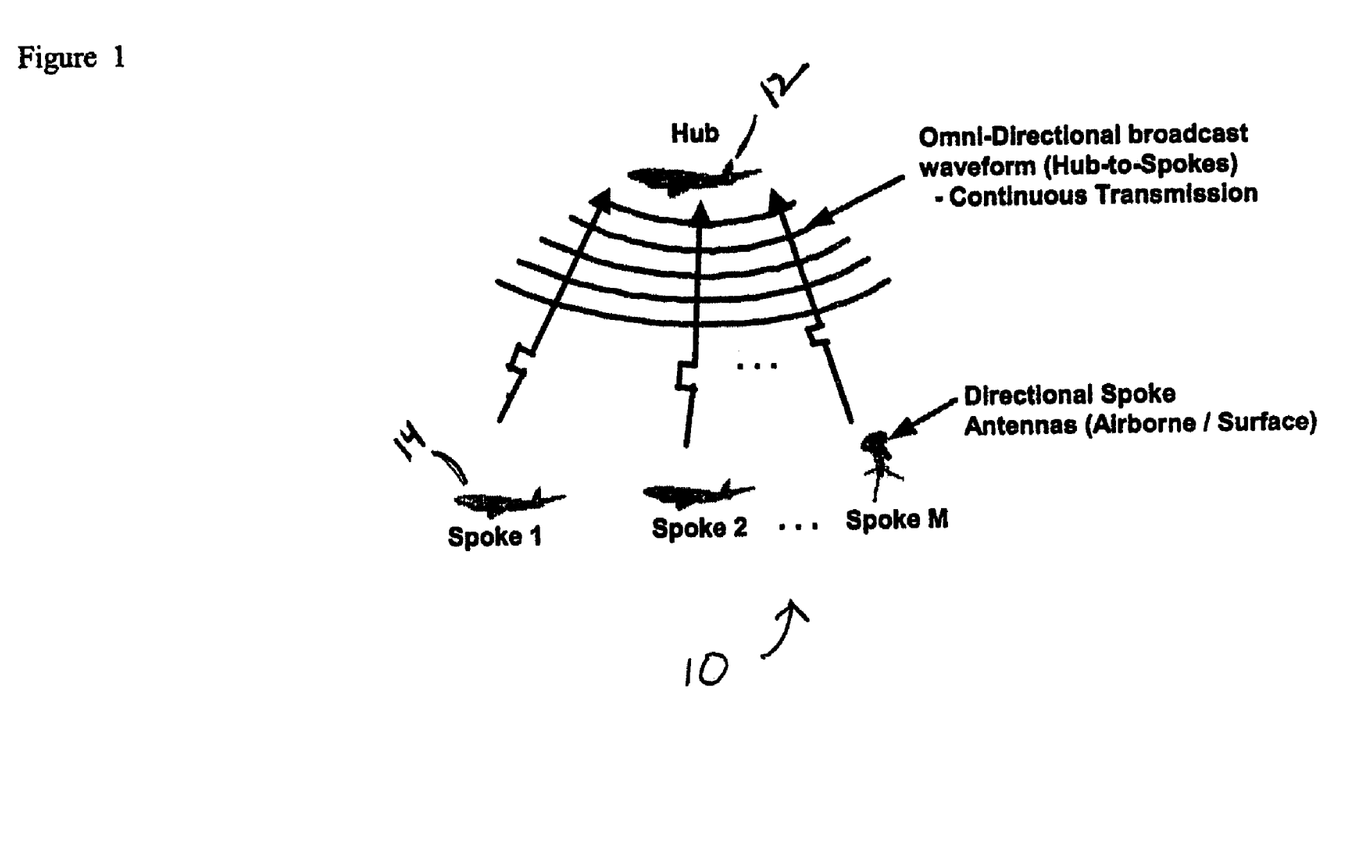
FIG. 1 is a pictorial diagram of a Hub-Spoke system architecture incorporating features of the present invention.

Referring to FIG. 1, there is shown a pictorial diagram of a HUB 12—SPOKE 14 telecommunications system incorporating features of the present invention. Although the present invention will be described with reference to the embodiment shown in the drawings, it should be understood that the present invention might be embodied in many alternate forms of embodiments, e.g., point-to-point duplex links or point-to-multipoint links. In addition, it should be understood that the teachings herein may apply to any group or assembly of hybrid TDMA-SS receivers, including those that are fixed in place; vehicle mounted; and/or hand carried; as illustrated in FIG. 1.

Figure 2:
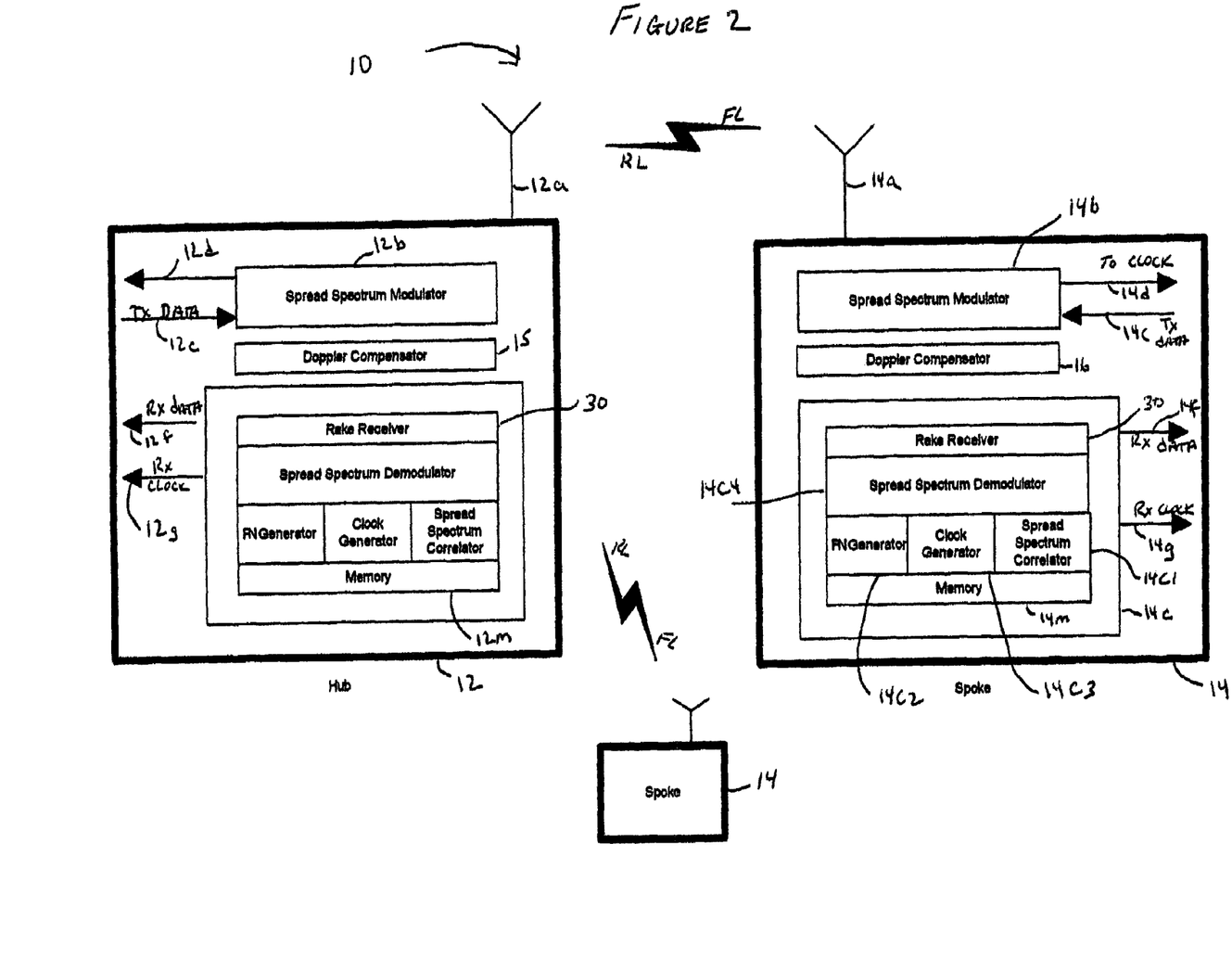
FIG. 2 is a block diagram of a communication system incorporating features of the present invention shown in FIG. 1.

Referring also to FIG. 2 there is shown a block diagram of a Spread Spectrum communication system incorporating features of the present invention shown in FIG. 1. FIG. 2 shows a full-duplex system 10 that is suitable for practicing this invention. Specifically, the system 10 employs direct sequence spread spectrum based techniques over an air link to provide data transfer between HUB 12 and SPOKE 14. The forward link (FL) from HUB 12 to SPOKE 14 contains a spread spectrum waveform that is constructed in the manner described herein, with the PN code being composed of even-length and/or maximal length PN codes. In a similar manner, the return link (RL) from SPOKE 14 to HUB 12 contains a spread spectrum waveform that is similar, or identical, to that of the FL.

Still referring to FIG. 2, HUB 12 includes a Spread Spectrum Modulator (SSM) 12b; the SSM 12b generates a desired spread spectrum waveform at a desired RF frequency. The SSM 12b also provides a Tx clock 12d that is used to clock the Tx Data 12e into the SSM 12b. The SSM 12b then combines the Tx data 12e with a spread spectrum PN code to produce the desired spread spectrum waveform. HUB 12 also includes an antenna 12a, which may transmit at any suitable RF frequency.

The signal generated by HUB 12 and transmitted by antenna 12a via the FL and is received by SPOKE 14 via antenna 14a. Spoke 14 includes one or more spread spectrum correlators 14c1, PN generator 14c2, clock generator 14c3, spread spectrum demodulator (SSD) 14c4, and a correlation rake receiver 30 (e.g., a parallel PN code correlator). The received signal is demodulated by SSD 14c4. Once the signal is acquired and the SPOKE 14 is tracking the received signal, the Rx Clock 14g and Rx Data 14f are output to the intended receiver circuitry. It will be appreciated that the clocks 14g and 12d are synchronous and may be commanded to change frequency to correspond with PN code epochs as will be described herein; thus advantageously providing means to vary the data rate without interruption; and without the need for conventional bit synchronizers with associated synchronization time.

Similarly, SPOKE 14 generates a Tx Clock 14d and Tx Data 14e using the Spread Spectrum Modulator 14b in a similar fashion described earlier for HUB. Likewise, HUB 12 may receive the RL signal via antenna 12a, and demodulate and track the signal as described earlier with receiver 12c to provide Rx Data 12f and Rx Clock 12g to the intended user.

A complete sequence of the PN encoded preamble is switched at a periodic rate. This embodiment allows for the full sequence over the preamble and message portions of the hail to be switched substantially at the same time; advantageously resulting in negligible timing ambiguity between receiver and transmitter; and uncomplicated management of cross correlation properties of the PN sequences.

For example, a PN-code change rate about 5% that of a chipping rate, or 320 chips/0.617 ms=519 Kchips/s. The time required for a complete code to change for 32 symbols of preamble is 32 symbols ×100/519 Kc/s=6.2 ms. This method would accommodate a complete code change every 6.2 milliseconds by increasing the correlation length by 10%.

In another embodiment of the present invention the PN code sequences are incrementally shifted. This embodiment allows for slowly changing the PN-code so that there is a negligible abrupt boundary between the changes. As time passes, the code changes, however the search window is only changed by the incremental amount. For example, a 32 symbol length PN detection portion of a preamble, with a processing gain of a 100 translates to a PN correlator of 3200 chips long. With a PN correlator 10% longer than the preamble, 320 chips of uncertainty could be tolerated in the received signal. This would allow the code to be incrementally changed by 320 chips during a 0.617 millisecond uncertainty due to range.

Shifting by several chips periodically rather than one chip can also accomplish shifting sections of the PN-Code at a time. This advantageously allows the PN-code to be incremented by one or more symbol boundaries allowing timing ambiguities relative to the PN code phase to be resolved to larger discrete boundaries. Furthermore, symbol boundaries are synchronized by the code epoch and increase the probability of detecting a synch word. For example, incrementing the PN code by 100 chips every 200 microseconds; instead of one chip every 2 microseconds. As the sizes of the increments are increased, the increment size will drive the added correlation window size of the correlator. In all cases the PN code-switching rate is limited such that the receiver only needs to be concerned about the ambiguity due to a single switch between two PN-code sequences. Once the preamble sequence is detected and a synch is detected, all timing information is available to allow the remaining message portion of the sequence to change, in a predetermined fashion, by a large amount without any ambiguity to the receiver.

For both periodic and shifting PN-code sequence generators, the code changing rate may be advantageously adjusted to correspond to the perceived interceptor threat and the desired level of protection. It is preferred that the switch period be great enough to ensure that there are not more than two codes overlapping. It will be appreciated that in alternate embodiments any suitable switch period may be used.

This equates to a time between PN code switches of greater than 0.6 milliseconds for every 100 nautical mile range uncertainty. If the PN code is switched every 6 milliseconds, the 0.6 millisecond overlap time is only 10% of the code usage duration. This allows for a receiver to only look for two possible hailing preamble code sequences for 10% of the time. The result is a minimal increase in the probability of false detect at a time when the receiver looks for both codes.

Figure 3:
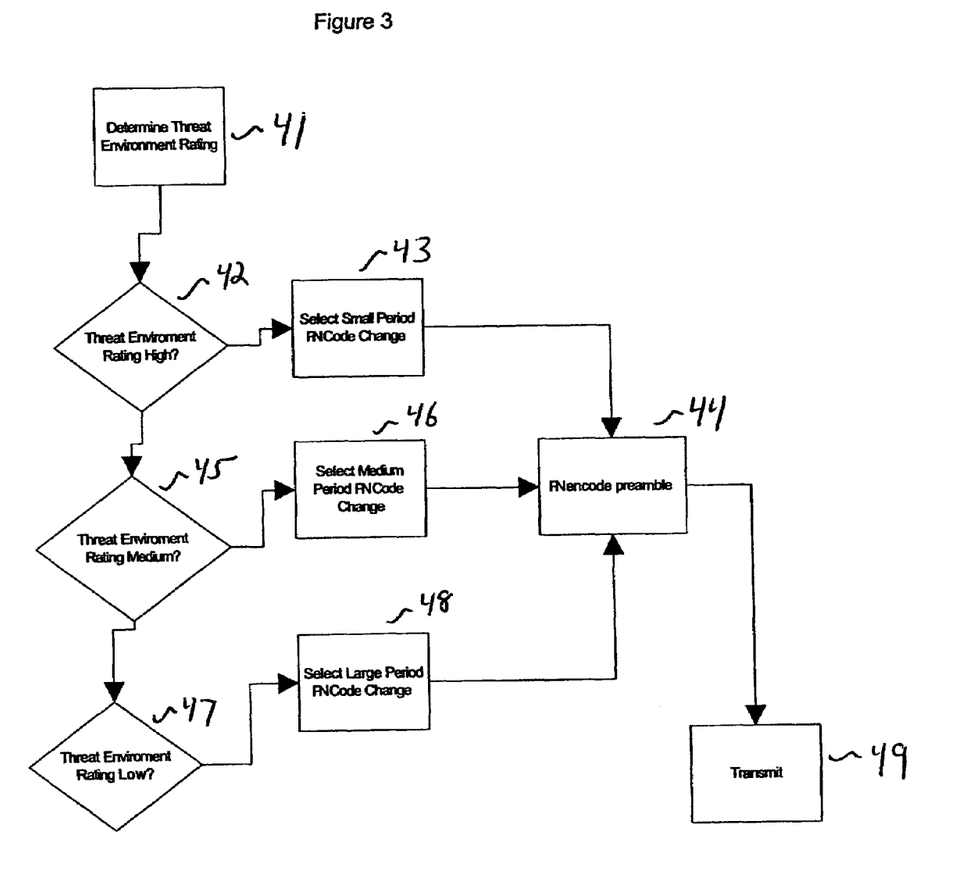
FIG. 3 is a method flow chart showing steps for one method of implementing PN preamble encoding selection features of the present invention shown in FIG. 2.

Referring also to FIG. 3 there is shown a method flow chart showing steps for one method of implementing PN preamble encoding selection features of the present invention shown in FIG. 2. The selection of the rate at which the PN codes are changed for both periodic and shifting code sequence generators is dependent on the desired level of resistance to various interceptor threats. Step 41 determines the threat environment rating. For example, the threat environment rating may be based upon known intercept units in the broadcast area and/or the sensitivity of the message following the PN encoded preamble. If the threat environment rating is high a corresponding period of the PN code change is relatively small, step 43. If the threat rating is medium, step 45, a corresponding period of the PN code change is medium. A low threat rating determination, step 47, results in a corresponding large PN code change period, step 48. Step 44 PN encodes the preamble according to the selected PN change steps 43, 46, or 48, and step 49 transmit the PN encoded preamble.

Dynamically adjusting the PN code change period allows different levels of protection to be achieved. For example, a higher rate of change (small PN code change period) for the preamble PN code will provide higher protection against interceptor and jamming threats, since less time is allowed for an unfriendly or unintended receiver to process the signal and to successfully use the information against the intended links. Although defining fast vs. slow switching is relative to specific scenarios, changing the full sequence, for example, every 1 to 6 milliseconds (small period) would likely defeat most high level interceptor threats, considering related propagation delays and processing times. A medium threat could require switching the code on the order of every 6 to 60 milliseconds (medium period) and a low threat could require switching the code every 60 milliseconds to a few seconds (large period). It will be appreciated that in alternate embodiments any suitable switching period may be used.

In another example, a periodic code switching scenario, with a high interceptor threat, the full sequence could be switched. With a preamble PN code length of 3200 chips, a new code could be switched approximately every 6 milliseconds. At the end of each period the full 3200 chip sequence could be replaced with a new sequence. For a medium interceptor threat, the PN code sequence could be kept constant for a 50-millisecond period, and then switched to an entirely new sequence. For a low interceptor threat the PN code sequence could be switched once per second.

For a shifting PN code change only a portion of the PN code sequence is changed at a time. For example, a 10% code shift in a 3200-chip sequence causes a shift by 320 chips. For a high interceptor threat example, a shift could occur after a 0.6 millisecond period. After 6 milliseconds, the code would be shifted ten times resulting in the full code being replaced. For a medium interceptor threat example, a 10% shift or 320 chips could be shifted every 5 milliseconds and for a low interceptor threat example 320 chips could be shifted every 100 milliseconds.

Figure 4A:
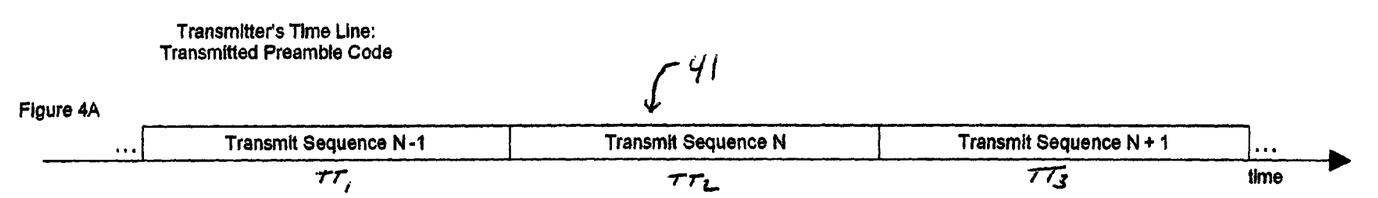
FIGS. 4A, 4b, and 4c are timelines detailing both transmitter and receiver timing and synchronization of subject invention for a periodically switched PN code sequence of a PN signal.
Figure 4B:
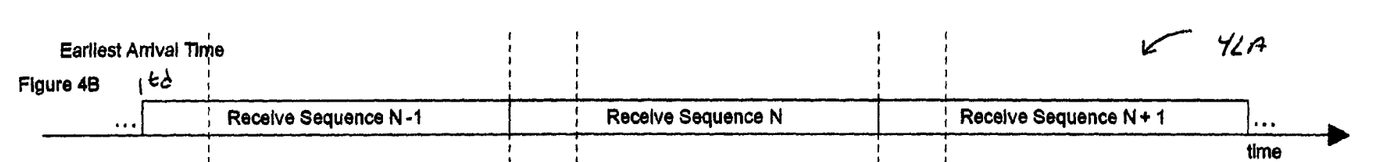
Figure 4C:
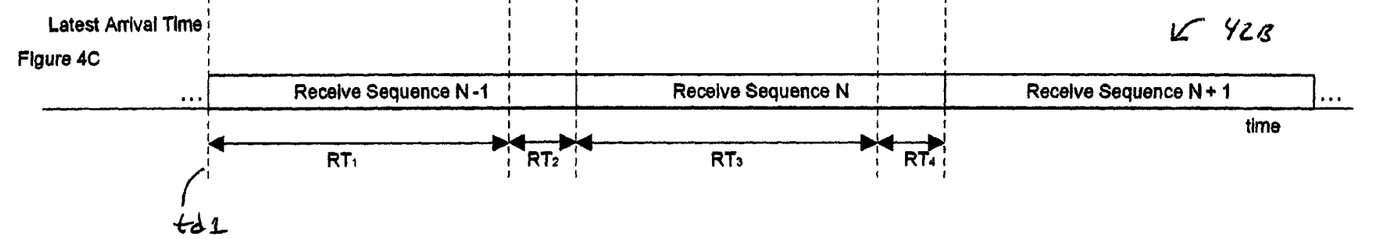
Figure 5:
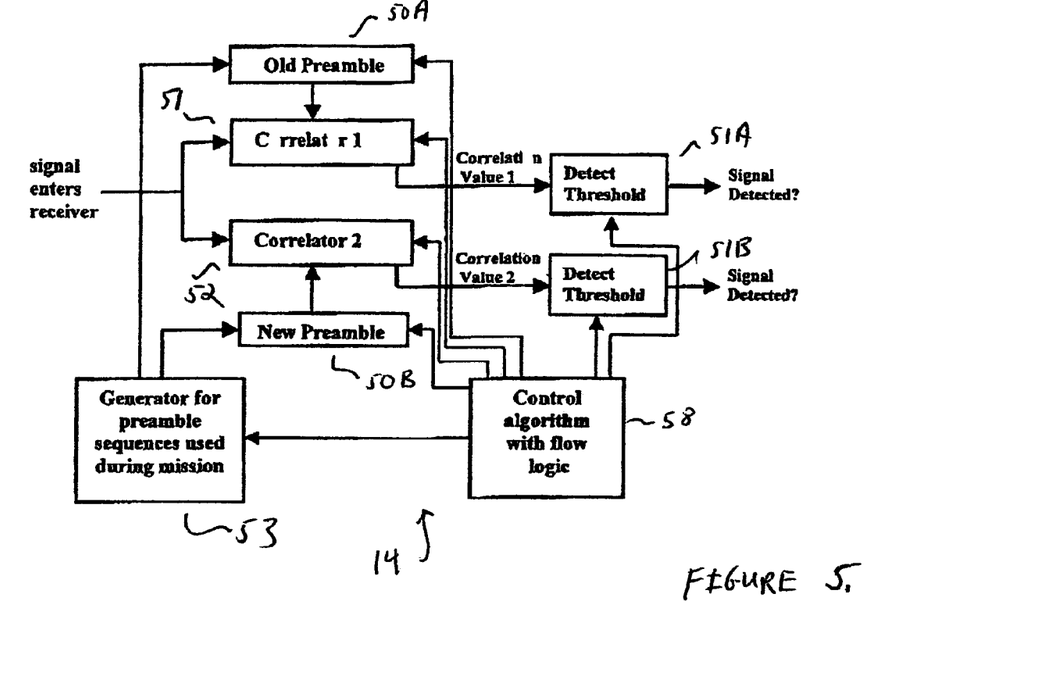
FIG. 5 is a receiver block diagram of subject invention utilized for detection of periodically switched PN code sequences of a PN signal.

Referring also to FIGS. 4A, 4B, and 4C, a timing and synchronization diagram between receiver and transmitter of subject invention is disclosed. FIG. 4A transmit timeline 41 depicts PN signals N−1, N, and N+1 as a continuous PN signal transmission encoded with a suitable periodically switched PN code transmit sequence. FIG. 4B receive timeline 42A, illustrates continuous PN code-receive sequences N−1, N, and N+1 beginning at an earliest arrival time td. Time Td corresponds to the earliest arrival time of transmit PN signal N−1 at the receiver when transmitter/receiver synchronization error is present. FIG. 4C time td1 corresponds to the latest arrival time of transmit PN signal N−1 at the receiver due to transmitter/receiver synchronization error and unknown range delay and is illustrated on timeline 42B. A transmitted PN signal at time TT1, FIG. 4A, arrives at the receiver (FIG. 2, item 14) at some time between td and td1. During receive time RT1, the receiver is searching only for transmitted PN signal N−1. Referring to FIG. 5, during the RT1 only one correlator 51 is required for demodulation of PN signal N−1. Correlator 52 is not actively searching or demodulating a PN signal.

Due to timing uncertainty and unknown range delay (td–td1) receive sequence N−1 is still correlating PN signal N−1 after the termination of transmitted PN signal N−1, item $TT_1$, and during the transmission of PN signal N, $TT_2$. During this time RT2, PN signals N and N−1 are actively searched and correlated in correlators 51 and 52, respectively. This continues for the duration of receive sequence N−1. Receive sequence N next begins to correlate transmitted PN signal N during time RT3. During this period only PN signal N is actively being searched therefore only correlator 51 is required for demodulation. Due to timing uncertainty and unknown range delay (td–td1) receive sequence N is still correlating PN signal N even after PN signal N has finished transmitting and PN signal N+1 has begun transmitting. During this time period RT4, both PN signals N+1 and N are actively correlated and searched in correlators 51 and 52. This process of detection continues for the duration of the PN signal sequence transmission.

In the case of a burst transmission, the method assumes that a burst could occur at any time, the receiver is actively searching for the burst, and that the receiver would demodulate the burst signal upon arrival. All transmitters and receivers utilizing the method could be synchronized to the time lines of FIG. 4. When a burst transmission starts, a transmitter may use a PN code associated with a time period in which the burst is to occur. For example, any time during time period TT1, a transmit burst signal would contain the PN code sequence assigned to time TT1. During time RT1, the receiver is actively searching for the PN code assigned to time TT1. If during time RT1, a receiver detects a correlation between the received signal and the assigned PN sequence, a burst has been detected and the receiver demodulates the remaining signal. Due to range delays between transmitter and receiver, during time RT2 the receiver actively searches for both PN codes assigned to time TT1 and PN codes assigned to time TT2. If a correlation is detected between the received signal and either PN code sequence the receiver uses the correlated PN code sequence to demodulate the remaining portion of the signal. The overlap period, RT2, accounts for the timing uncertainty and range uncertainty that will occur between all users. This process of detecting a potential burst transmission continues throughout the duration of the burst signal transmissions.

Figure 6:
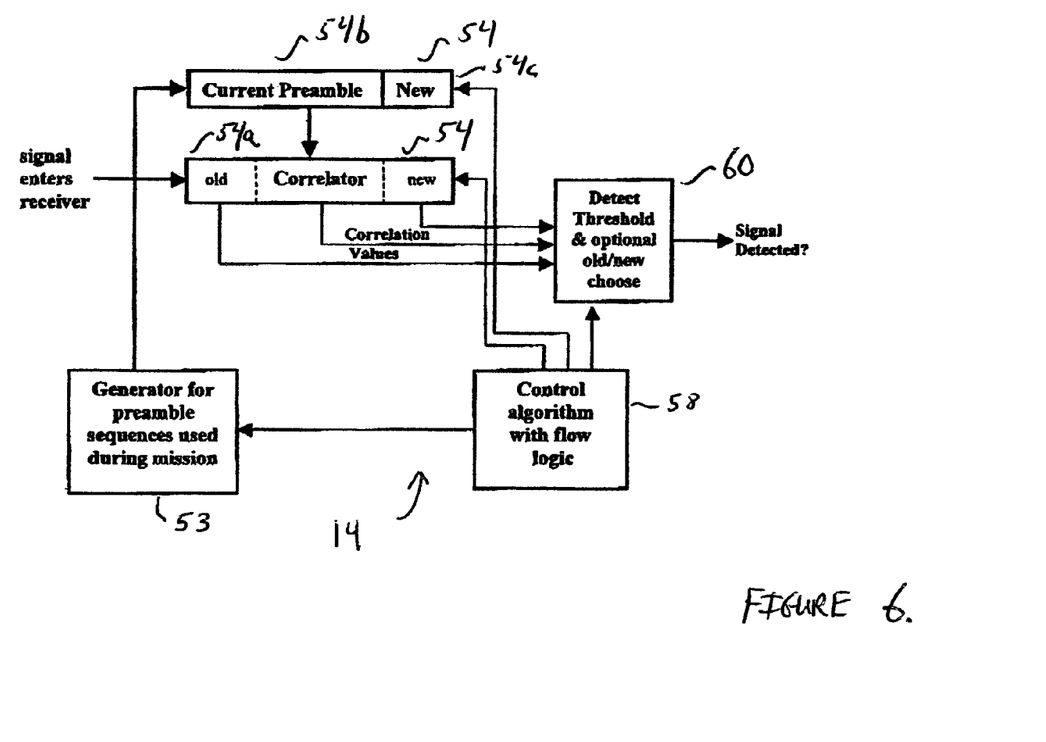
FIG. 6 is a receiver block diagram of subject invention utilized for detection of shifting PN code sequences of a PN signal.

FIGS. 5 and 6 illustrate the correlator portions of receivers designed to detect both periodic and shifting PN code sequences, respectively. These receiver sections sample a signal after the signal has been down converted. For a periodic PN code sequence signal, the samples of the signal are shifted serially into correlators 51 and 52 of FIG. 5. Referring also to FIG. 4, the fixed PN code associated with time TT1 is loaded in old preamble storage location 50A and the next fixed PN code associated with time TT2 is loaded in new preamble storage location 50B. During receive time TT1 only correlator 51 is active since burst signals are not expected using anything other than the PN code associated with time TT1. Disabling correlator 52 during time TT1 reduces the chances of a false detect due to random noise accidentally correlating with a PN sequence. During time RT2, both correlators 51 and 52 are active, and during receive time RT3 only correlator 52 is active, and so on. If a correlation or match between a received signal and an assigned PN code sequence occurs the correlation results are compared to detect threshold 51A and 51B. Detect threshold circuitry 51A and 51B compare the correlation results against a pre-defined threshold value. The threshold value is selected to discriminate between an actual signal received and a random correlation due to atmospheric noise. After the signal is detected, additional receiver circuitry known in the art demodulates the signal. During receiver time RT3, correlator 1 (item 51, FIG. 5) is no longer active since the receiver does not expect a burst transmission to start with the first sequence. During this time, the third PN code sequence associated with time TT3 can be loaded into old preamble storage location 50A. Generator block 53, is any suitable device known in the art to generate PN code sequences, such as linear feedback shift registers or memories containing full sequences. A state machine 58 with suitable algorithm control and flow logic may be used for timing throughout the correlation process.

FIG. 6 further illustrates features of the present invention, e.g., a receiver block diagram for detection of a shifting PN Code sequence. In this example only a portion of the PN code sequence is changed at each change period. During receive time RT1, only the current preamble section of correlator 54 is active. A single correlator 54 shifts the PN code sequence signal at time TT1 into "old", "current" and "new" sections, 54a, 54b, and 54c respectively. The correlation values from the "old" section and "current" section are summed and compared to an assigned PN code sequence in detection threshold circuitry 60. During receive time, RT2, the receiver actively searches both "old" and "new" sections of the PN code sequence since PN code sequence at time TT2 has shifted through correlator 54. The correlation values from the "old" and "current" sections of correlator 54 are summed and the correlation values from the "current" and "new" sections are also summed and compared to an assigned PN code sequence in detection threshold circuitry 60. The two sums correspond to old and new PN code sequences respectively. During receive time RT3, the "current" and "new" PN code sequences are shifted to the left by a predetermined amount. In the examples of subject invention the shift is 320 chips or 10% of the sequence. This shift portion of the PN code sequence, which was in the new section of correlator 54, has now been shifted to the left, and is included in the right most portion of the "current" section of the PN code sequence. During the shift the left most portion of the "current" PN code sequence is discarded. The shifting PN code sequence method switches a "new" section of the PN code sequence into the correlator 54 compare register at each switch period. As the size of the "new" section of the PN code sequence is increased to the length of the full sequence this shifting PN code sequence method becomes equivalent to the periodic PN code sequence method. The "old" section will contain the full old preamble while the "new" section of correlator 54 will contain the full new preamble.

In addition, in alternate embodiments features of the present invention may be implemented in a programmable device such as an integrated circuit (IC). It will be further appreciated that the IC may be a field programmable gate array (FPGA), an application specific IC (ASIC), or a function of MDC firmware. A suitable programming language such as a Very High Speed Integrated Circuit (VHSIC) Hardware Description (VHDL) Language file may define the operation of the ICs or firmware. Accordingly, the present invention is intended to embrace all such alternatives, modifications and variances that fall within the scope of the appended claims.

What is claimed is:

1. A method for effecting PN code sequence changes, the method comprising:
   determining an interceptor threat level;
   determining a first transmitter PN code sequence associated with said interceptor threat level, wherein determining the first transmitter PN code sequence associated with said interceptor threat level further comprises:
      changing the first transmitter PN code sequence to a second transmitter PN code sequence;
      encoding a second transmitter PN signal with the second transmitter PN code sequence;
      transmitting the second transmitter PN encoded signal, wherein transmitting the second transmitter PN encoded signal further comprises transmitting the second transmitter PN encoded signal during a second time frame;
   encoding a first transmitter PN signal with the first transmitter PN code sequence;
   transmitting the first transmitter PN encoded signal, wherein transmitting the first transmitter PN encoded signal further comprises transmitting the first transmitter PN encoded signal during a first transmitter time frame;
   receiving the first transmitter PN encoded signal, wherein receiving the first transmitter PN encoded signal further comprises receiving the first transmitter PN encoded signal during a first receiver time frame; and
   PN decoding the first transmitter PN encoded signal.

2. A method as in claim 1 wherein the first transmitter PN code sequence comprises substantially a six millisecond time frame.

3. A method as in claim 1 wherein the second transmitter PN code sequence comprises substantially a six millisecond time frame.

4. A method as in claim 1 wherein changing the first transmitter PN code sequence to the second transmitter PN code sequence comprises:
   correlating an integer variable N to said interceptor threat level; and
   phase shifting the first transmitter PN code sequence N chips to form the second transmitter PN code sequence.

5. A method as in claim 1 wherein PN decoding the first transmitter PN encoded signal comprises:
   correlating the first transmitter PN encoded signal with a first receiver PN code sequence, wherein the first receiver PN code sequence is associated with said interceptor threat level.

6. A method as in claim 5 wherein correlating the first transmitter PN encoded signal with the first receiver PN code sequence further comprises correlating the first transmitter PN encoded signal with the first receiver PN code sequence during the first receiver time frame.

7. A method as in claim 5 wherein PN decoding the first transmitter PN encoded signal further comprises:
correlating the first transmitter PN encoded signal with a second receiver PN code sequence, wherein the second receiver PN code sequence is associated with said interceptor threat level.

8. A method as in claim 7 wherein correlating the first transmitter PN encoded signal with the second receiver PN code sequence further comprises correlating the first transmitter PN encoded signal with the second receiver PN code sequence during the first receiver time frame.

9. A method as in claim 8 wherein correlating the first transmitter PN encoded signal with the second receiver PN code sequence during the first receiver time frame further comprises correlating the first transmitter PN encoded signal with the second receiver PN code sequence during a subset time frame of the first receiver time frame.

10. A communications system, the communications system comprising:
a transmitter, wherein the transmitter comprises:
a transmitter controller adapted to determine an interceptor threat level;
a first transmitter PN generator adapted to generate a first transmitter PN code sequence associated with said interceptor threat level;
a transmitter modulator adapted to encode a first transmitter PN signal with the first transmitter PN code sequence;
a transmitter antenna adapted to transmit the first transmitter PN encoded signal, wherein the transmitter antenna adapted to transmit the first transmitter PN encoded signal further comprises:
the transmitter antenna adapted to transmit the first transmitter PN encoded signal during a first transmitter time frame;
a receiver, the receiver comprising:
a receiver antenna adapted to receive the first transmitter PN encoded signal during a first receiver time frame;
a receiver demodulator adapted to PN decode the first transmitter PN encoded signal; and
a second transmitter PN generator for generating a second transmitter PN code.

11. A communications system as in claim 10 wherein the receiver demodulator adapted to PN decode the first transmitter PN encoded signal further comprises:
a first correlator adapted to correlate the first transmitter PN encoded signal with the first transmitter PN code sequence; and
a first threshold detector coupled to the first correlator, wherein the first threshold detector is adapted to detect a PN correlated signal from the first correlator.

12. A communications system as in claim 11 wherein the receiver demodulator adapted to PN decode the first transmitter PN encoded signal further comprises:
a second correlator adapted to correlate the first transmitter PN encoded signal with the second transmitter PN code;
a second threshold detector coupled to the second correlator, wherein the second threshold detector is adapted to detect a PN correlated signal from the second correlator.

13. A program storage device readable by a machine, tangibly embodying a program of instructions executable by the machine to perform a for effecting PN code sequence changes, the instructions comprising:
determining an interceptor threat level;
determining a first transmitter PN code sequence associated with said interceptor threat level, wherein instructions determining the first transmitter PN code sequence associated with said interceptor threat level further comprises:
changing the first transmitter PN code sequence to a second transmitter PN code sequence;
encoding a second transmitter PN signal with the second transmitter PN code sequence;
transmitting the second transmitter PN encoded signal, wherein transmitting the second transmitter PN encoded signal further comprises transmitting the second transmitter PN encoded signal during a second time frame;
encoding a first transmitter PN signal with the first transmitter PN code sequence; and
transmitting the first transmitter PN encoded signal, wherein transmitting the first transmitter PN encoded signal further comprises transmitting the first transmitter PN encoded signal during a first transmitter time frame.

14. A program storage device as in claim 13 wherein instructions changing the first transmitter PN code sequence to the second transmitter PN code sequence comprises:
correlating an integer variable N to said interceptor threat level; and
phase shifting the first transmitter PN coding sequence N chips to form the second transmitter PN code sequence.

15. A program storage device as in claim 13 further tangibly embodying a program of instructions executable by the machine for determining PN code sequence changes, the instructions comprising:
receiving the first transmitter PN encoded signal, wherein receiving the first transmitter PN encoded signal further comprises receiving the first transmitter PN encoded signal during a first receiver time frame; and
PN encoding the first transmitter PN encoded signal, wherein PN decoding comprises correlating the first transmitter PN encoded signal with a first receiver PN code sequence, wherein the first receiver PN code sequence is associated with said interceptor threat level, wherein correlating the first transmitter PN encoded signal with the first receiver PN code sequence further comprises:
correlating the first transmitter PN encoded signal with the first receiver PN code sequence during the first receiver time frame.

16. A program storage device as in claim 15 further comprising:
correlating the first transmitter PN encoded signal with a second receiver PN code sequence, wherein the second receiver PN code sequence is associated with said interceptor threat level, wherein correlating the first transmitter PN encoded signal with the second receiver PN code sequence further comprises:
correlating the first transmitter PN encoded signal with the second receiver PN code sequence during the first receiver time frame.

* * * * *